2,894,043

PREPARATION OF VINYLIDENE CHLOROFLUORIDE

Erhard J. Prill, Dayton, Ohio, assignor to Monsanto Chemical Company, St. Louis, Mo., a corporation of Delaware No Drawing. Application February 16, 1956
Serial No. 565,776

3 Claims. (Cl. 260—653.5)

An object of the present invention is to provide a commercially feasible method for the preparation of vinylidene chlorofluoride.

Vinylidene chlorofluoride, i.e., 1-chloro-1-fluoro-ethylene, is a valuable monomer which is useful in the preparation of polymeric materials.

The present invention is directed to the preparation of vinylidene chlorofluoride according to the following series of reactions:

I   $CH_3CCl_3 + HF \longrightarrow CH_3CCl_2F$

II  $CH_3CCl_2F \xrightarrow{\Delta} CH_2=CClF$

The present invention is also directed to a method of conducting reaction II above, in which a substantial portion of dichlorofluoroethane is pyrolyzed to vinylidene chlorofluoride, particularly at reaction temperatures of 465 to 535° C.

A method of conducting reaction I above, in which stannic fluoride on activated carbon or aluminum fluoride is used as a catalyst at fluorination temperatures, such as 60 to 150° C. is described and claimed in my copending application, Serial No. 565,777, filed of even date herewith.

One of the known prior art procedures for preparing vinylidene chlorofluoride involves the bromination of 1,1-dichloroethylene to 1,2-dibromo-2,2-dichloroethane, fluorination of the 1,2-dibromo-2,2-dichloroethane to 1-bromo-2,2-dichloro-2-fluoroethane by the addition of successive separate small portions of red mercuric oxide and anhydrous hydrogen fluoride, and then dehalogenation of the 1-bromo-2,2-dichloro-2-fluoro-ethane by the use of mossy zinc in anhydrous ethanol. Not only is this prior art procedure somewhat lengthy and tedious, but it is a series of batch reactions, while the simple vapor phase reactions of the present invention can readily be run as a continuous process. The present invention provides a simple 2-step procedure for converting the readily available methylchloroform to vinylidene chlorofluoride.

Pyrolysis is a known method of dehydrohalogenating and/or cleaving chlorofluoro compounds. However, in the pyrolysis of such compounds, it has been customary to employ high temperatures, such as 600 or 700° C. to 1000° C. By contrast, it has now been found that in order to obtain good conversions and yields in the pyrolysis of dichlorofluoroethane to vinylidene chlorofluoride it is necessary to use reaction temperatures of about 465 to 535° C. It has also been discovered that in the pyrolysis of dichlorofluoroethane it is necessary to use a reaction time of about 10 to 60 seconds, and a reaction time of 25 to 45 seconds is preferable. The reaction time is the time that a unit volume of the reactants remains in the reactor tube. This contact time may be calculated by dividing the volume of the reactor by the volume of the gas charged (at reaction temperature), per second.

The reactor used for the pyrolysis procedure was a 1 inch O.D. by 42 inch nickel tube of 375 ml. volume packed with nickel helices. The nickel helices were used to aid the transfer of heat to the vapors passing through the tube. The reactor was in a position inclined about 10° from the vertical, but it can be used in a horizontal, vertical or other position. Nickel was selected as the material for the tube and helices in order to have a reasonably economical material which would be fairly resistant to high temperatures and fluorine compounds. Moreover, if nickel, nickel chloride or nickel fluoride have any catalytic effect, they probably promote the pyrolysis reaction. It is also possible to use other metals having possible catalytic effects for the tube and helices, e.g., aluminum, or to use a tube lined with a noble metal such as platinum, palladium or silver.

The same 1" x 42" nickel tube was used for the fluorination reaction, but in this case it was packed with catalyst rather than nickel helices.

EXAMPLE 1

A quantity of 1,1-dichloro-1-fluoroethane was placed in a reservoir which was connected successively through a needle valve, a rotameter and a connecting tube to the nickel reactor tube. The connecting tube was provided with a side tube for the admission of nitrogen, and a section of the connecting tube adjacent to the nickel reactor tube was wrapped with Nichrome wire in order to have a heating means for a preliminary heating and vaporizing section. The nickel reactor tube was provided with a jacket for heating. At its discharge end, the reactor tube was connected to a connecting tube, which passed through a stopper into a vacuum flask and the lower end of the connecting tube was immersed in water in the vacuum flask to provide a water trap for acid gases. The vacuum flask was connected through washing and drying tubes to a receiver flask immersed in Dry Ice. The washing tube was filled with ¼" Berl saddles and provided with a dropping funnel so that water could be trickled dropwise down through the saddles countercurrent to incoming gases. The drying tube was packed with calcium chloride.

The preliminary heating section was heated to a temperature of 280° C., and the reactor was heated, the temperature being 515° C. and 494° C. at two positions in the reactor. The dichlorofluoroethane was fed into the reactor at a constant rotameter reading. During the three-hour run, the preliminary heating temperature varied from 280 to 335° C., and the reactor temperatures from 494 to 520° C. The quantity of dichlorofluoroethane passed through was 1.865 moles (218 grams) for an average rate of 0.62 mole/hour. The pyrolysate collected in the receiver amounted to 153 grams. By titration, the water in the water trap was found to contain 1.6 gram equivalents of acid, and chloride analysis showed 1.49 gram equivalents of chloride ion.

The 153 grams of pyrolyzate was fractionated, using a low temperature still, and 97 grams of vinylidene chlorofluoride was distilled at −26.5° C. to −26° C., for a conversion of 64.5% of the material charged. After changing to a regular still with a low temperature head, the bulk of the remaining material distilled at 28° to 30.5° C. By refractive index it was determined that the higher boiling material contained 15.4 grams 1,1-dichloroethylene, i.e., vinylidene chloride, and 28.6 grams of the starting dichlorofluoroethane. The 97 grams of vinylidene chlorofluoride is a yield of 74% of theory, based on unrecovered dichlorofluoroethane.

In the above run, the average rate of flow would cause a unit volume of the dichlorofluoroethane or its conversion products to remain in the reactor tube for about 36 seconds.

The following table demonstrates the importance of reaction temperature and contact time in the production of vinylidene chlorofluoride by pyrolysis. Run 1 of the table is the run in Example 1 above, and the other runs were conducted in the same apparatus and with the same procedure.

Table.—Pyrolysis of 1,1-dichloro-1-fluoroethane

| Run | CH₃CFCl₂ Feed, moles/hr. | Average Reactor Temp., °C | Contact Time, sec. | CH₃CFCl₂ Recovered, Percent | Products Recovered, Percent Conversion | | Yield of CH₂=CFCl, Percent |
|---|---|---|---|---|---|---|---|
| | | | | | CH₂=CFCl | CH₂=CCl₂ | |
| 1 | 0.62 | 500 | 36 | 12.9 | 64.5 | 8.6 | 74 |
| 2 | 1.85 | 500 | 12 | 44.8 | 39.5 | 7.6 | 71.5 |
| 3 | 0.50 | 400 | 49 | 64.9 | 12.4 | 7.7 | 35.3 |
| 4 | 1.95 | 600 | 10 | 0 | 27.4 | 0 | 27.4 |

In run 1 the conversion and yield were good. In run 2, a shorter contact time not only lowered the conversion, but it is notable that it did not improve the yield, and in fact resulted in a slightly lower yield. In run 3, a lower reaction temperature, even though coupled with a longer contact time, resulted in poor conversion and a poor yield. In run 4, a higher reaction temperature, even with a short contact time, gave a poor conversion and a poor yield. The absence of dichlorofluoroethane and 1,1-dichloroethylene from the pyrolysis product of run 4 may have been caused by partial hydrolysis of the reactor off gases in the water trap.

$$\text{Contact time} = \frac{3600 \times 273 \times V}{22,400 \times N \times T}$$

in which V is the volume of the reactor in milliliters, N is the moles per hour feed rate, T is the absolute temperature.

EXAMPLE 2

Methyl chloroform was charged by gravity through a rotameter into the reactor tube at a feed rate of 0.96 gram-equivalent per hour. At the same time, anhydrous hydrogen fluoride was charged at the rate of 2.18 gram-equivalents per hour. The reactor tube was filled with an aluminum fluoride catalyst packing. After four hours during which the reaction tube was maintained at a temperature around 100° C., the material collected in the dry ice cooled receiver and the organic layer in the water trap were fractionated by distillation. The distillation showed that 29.9% of the methyl chloroform charged had been converted to 1,1-dichloro-1-fluoroethane of 96.5% purity, and that 62.8% of the methyl chloroform was recovered. Most of the impurity in the dichlorofluoroethane is 1,1-dichloroethylene which distills at about the same temperature, 29 to 31° C. The fact that the amount of this impurity is small is particularly advantageous when it is desired to immediately pyrolyze the dichlorofluoroethylene without further purification. As the methyl chloroform boils at 74.1° C., the dichlorofluoromethane can be readily separated therefrom by distillation, and subjected to the pyrolysis reaction, while the methyl chloroform is recycled throught the fluorinator. This combination of fluorination and pyrolysis reactions is particularly useful as a continuous flow process. The aluminum fluoride catalyzed fluorination not only gives a dichlorofluoroethane product of good purity, but it results in a yield of 80.4% of theory, based on unrecovered methyl chloroform.

While vapor phase fluorination over aluminum fluoride, AlF₃, is preferred, particularly at temperatures of 90 to 125° C. for 5 to 20 seconds, the fluorination can also be conducted over stannic fluoride on activated carbon. These two catalyst systems are ordinarily used at temperatures of 60 to 125° C. for contact times of 5 to 60 seconds. It will be recognized that the optimum contact times will usually vary inversely with the reaction temperatures. Effective fluorination conditions are further described in my aforementioned copending application, Serial No. 565,777, filed February 16, 1956.

Other and less desirable catalysts which can be used for the fluorination reaction are antimony pentafluoride on activated carbon and antimony trifluoride on activated carbon. Moreover, the fluorination can be conducted under pressure in the absence of a catalyst, although this procedure involves more costly apparatus and is more cumbersome to combine into a continuous process with the pyrolysis reaction.

In the pyrolysis reaction the vinylidene chlorofluoride product can be separated, and the remaining organic pyrolyzate (principally dichlorofluoroethane and 1,1-dichloroethylene) can be recycled, alone, or mixed with additional dichlorofluoroethane, as will be understood by those skilled in the art. The fact that the vinylidene chlorofluoride boils about 50 to 55° C. lower than the other pyrolyzate material makes recycling readily applicable to this process.

The pyrolysis reaction of the present invention is conveniently conducted at or near atmospheric pressure, but it can also be conducted at higher or lower pressures. The pyrolysis reaction is particularly adapted to and useful for continuous flow systems.

While it is ordinarily necessary to use the pyrolysis temperature and reaction time conditions specified herein, it will be recognized that these conditions can be modified somewhat with varying pressures, heat transfer properties of the reactor, or in the presence or absence of catalysts. All of these modifications within the skill of the art are contemplated by the present invention. Among the catalysts contemplated are cobalt, nickel, chromium, and other metals and any known dehydrohalogenation catalysts.

A commercially feasible method of preparing vinylidene chlorofluoride has been described. The method involves the fluorination of methyl chloroform to 1,1-dichloro-1-fluoroethane, and pyrolysis of the 1,1-dichloro-1-fluoroethane to vinylidene chlorofluoride.

I claim:

1. The method of preparing vinylidene chlorofluoride which comprises pyrolyzing 1,1-dichloro-1-fluoroethane at a temperature of 465 to 535° C. to convert a substantial portion of said 1,1-dichloro-1-fluoroethane to vinylidene chlorofluoride.

2. The method of preparing vinylidene chlorofluoride which comprises pyrolyzing 1,1-dichloro-1-fluoroethane at a temperature of 465 to 535° C. for 25 to 45 seconds.

3. The method of preparing vinylidene chlorofluoride which comprises pyrolyzing material consisting of 1,1-dichloro-1-fluoroethane at a temperature of about 500° C. for about 36 seconds in a nickel tube packed with nickel particles.

References Cited in the file of this patent

UNITED STATES PATENTS

| | | |
|---|---|---|
| 2,551,573 | Downing et al. | May 8, 1951 |
| 2,627,529 | Feasley et al. | Feb. 3, 1953 |
| 2,628,989 | Miller | Feb. 17, 1953 |
| 2,673,139 | Woolf et al. | Mar. 23, 1954 |
| 2,709,688 | Bandes et al. | May 31, 1955 |

FOREIGN PATENTS

| | | |
|---|---|---|
| 670,130 | Germany | Jan. 12, 1939 |

OTHER REFERENCES

Torkington et al.: "Trans. Faraday Soc.," vol. 41 (1945), page 237.